United States Patent
Saito et al.

(10) Patent No.: US 10,834,297 B2
(45) Date of Patent: Nov. 10, 2020

(54) IMAGE CAPTURING APPARATUS CAPABLE OF TIME CODE SYNCHRONIZATION, CONTROL METHOD OF THE SAME, STORAGE MEDIUM, AND IMAGE CAPTURING SYSTEM

(71) Applicant: CANON KABUSHIKI KAISHA, Tokyo (JP)

(72) Inventors: Tadanori Saito, Tokyo (JP); Michinori Nakajima, Kawasaki (JP); Toshio Minoshima, Hiratsuka (JP); Kazuyuki Iimura, Chikusei (JP); Kazuya Kitamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/217,440

(22) Filed: Dec. 12, 2018

(65) Prior Publication Data

US 2019/0199890 A1 Jun. 27, 2019

(30) Foreign Application Priority Data

Dec. 22, 2017 (JP) .................. 2017-246407

(51) Int. Cl.
*H04N 5/228* (2006.01)
*H04N 5/04* (2006.01)
*H04N 5/247* (2006.01)

(52) U.S. Cl.
CPC ............... *H04N 5/04* (2013.01); *H04N 5/247* (2013.01)

(58) Field of Classification Search
CPC ............... H04N 5/04; H04N 5/232061
USPC .................................. 348/222.1
See application file for complete search history.

(56) References Cited

U.S. PATENT DOCUMENTS

| 8,542,318 B2 | 9/2013 | Horikawa |
| 8,872,966 B2 | 10/2014 | Horikawa |
| 2007/0201815 A1* | 8/2007 | Griffin ............... G11B 27/034 386/231 |
| 2012/0050591 A1 | 3/2012 | Horikawa |
| 2014/0002707 A1 | 1/2014 | Horikawa |
| 2014/0184898 A1* | 7/2014 | Overliese ......... H01R 13/62905 348/372 |

FOREIGN PATENT DOCUMENTS

JP 2012-049980 A 3/2012

* cited by examiner

*Primary Examiner* — Usman A Khan
(74) *Attorney, Agent, or Firm* — Venable LLP

(57) ABSTRACT

An image capturing apparatus comprises: an image capturing unit configured to acquire a video signal including frames, and an output unit configured to output the video signal, a first time code for a time at which each frame of the video signal is acquired by the image capturing unit and information related to a second time code for a time at which each frame of the video signal is output by the output unit, to an external apparatus.

19 Claims, 11 Drawing Sheets

FIG. 11

TIME →

MODE CHANGE

VIDEO CAMERA x (MASTER)

| | | | | | | | | | |
|---|---|---|---|---|---|---|---|---|---|
| SENSOR VIDEO | Ax | Bx | Cx | Dx | Ex | Fx | Gx | Hx | Ix |
| TIME CODE (INTERNAL) | 11 | 12 | 13 | 14 | 15 | 16 | 17 | 18 | 19 |
| SDI OUTPUT TERMINAL — VIDEO | | | Ax | Bx | Bx' | Cx' | Dx' | Ex' | Fx' |
| SDI OUTPUT TERMINAL — TIME CODE | | | 11 | 12 | 12 | 13 | 14 | 15 | 16 |
| SDI OUTPUT TERMINAL — DELAY AMOUNT | | | 2 | 2 | 3 | 3 | 3 | 3 | 3 |
| SDI OUTPUT TERMINAL — MODE INFORMATION | | | – | – | M | M | M | M | M |

MODE CHANGE

VIDEO CAMERA y (SLAVE)

| | | | | | | | | | |
|---|---|---|---|---|---|---|---|---|---|
| SDI INPUT TERMINAL — VIDEO | | | Ax | Bx | Bx' | Cx' | Dx' | Ex' | Fx' |
| SDI INPUT TERMINAL — TIME CODE | | | 11 | 12 | 12 | 13 | 14 | 15 | 16 |
| SDI INPUT TERMINAL — DELAY AMOUNT | | | 2 | 2 | 3 | 3 | 3 | 3 | 3 |
| SDI INPUT TERMINAL — MODE INFORMATION | | | – | – | M | M | M | M | M |
| TIME CODE (INTERNAL) | | | 13 | 14 | 15 | 16 | 17 | 18 | 19 |
| SENSOR VIDEO | Ay | By | Cy | Dy | Ey | Fy | Gy | Hy | Iy |
| SDI OUTPUT TERMINAL — TIME CODE | | | 11 | 12 | 13 | 14 | 15 | 15 | 16 |
| SDI OUTPUT TERMINAL — VIDEO | | | Ay | By | Cy | Dy | Ey | Ey | Fy |

IMAGE CAPTURING APPARATUS CAPABLE OF TIME CODE SYNCHRONIZATION, CONTROL METHOD OF THE SAME, STORAGE MEDIUM, AND IMAGE CAPTURING SYSTEM

BACKGROUND OF THE INVENTION

Field of the Invention

The present invention relates to an image capturing apparatus capable of time code synchronization, a control method of the same, a storage medium, and an image capturing system.

Description of the Related Art

An image capturing apparatus such as a video camera includes a plurality of terminals in order to correspond to various applications. For example, a video camera that includes a terminal through which only a time code signal can be input for an application of inputting a time code signal, and a video camera including a terminal through which only a time code signal can be output for an application of outputting a time code signal are known. Other than this, a video camera including a terminal through which only an external synchronization signal can be input in order to input an external synchronization signal such as a Genlock (Generator Lock) signal is known.

On the other hand, providing a plurality of terminals in a video camera inhibits reduction of the size and cost of the video camera in some cases. In view of this, Japanese Patent Laid-Open No. 2012-049980 discloses a technique in which one terminal is provided with both functions of Genlock and inputting and outputting time codes, and by switching the functions according to the type of signal that is input, both an increase in the number of signals input and a reduction in size are achieved.

However, if simultaneous imaging using a plurality of video cameras is performed, an external synchronization signal needs to be input to achieve external synchronization of frames and the time code also needs to be input simultaneously. With the technique disclosed in Japanese Patent Laid-Open No. 2012-049980, in order to realize both external synchronization using Genlock signals and time code input and output, the input signal needs to be switched, which requires labor.

On the other hand, if an SDI (Serial Digital Interface) signal can be used as a reference signal for using the external synchronization signal and the time code, the external synchronization signal and the time code can be acquired simultaneously by an SDI terminal. However, there is a problem in that the time code on the slave side is delayed when an attempt is made to match (synchronize) time codes using a conventional SDI signal between a video camera x that is a master of the time code and a video camera y that is a slave. Specifically, a time lag (delay) caused by the processing of the video camera x is included in the period from when the video camera x performs imaging to when the video is output to the SDI output terminal. For this reason, the time code acquired by the video camera y from the SDI signal is delayed compared to the time code corresponding to the video currently being imaged by the video camera y. That is, there is a problem in that different time codes are added to the video frames imaged at the same time when an attempt is made to synchronize the videos imaged at the same time by a plurality of connected video cameras.

SUMMARY OF THE INVENTION

The present invention has been made in consideration of the aforementioned problems, and realizes a technique according to which it is possible for a plurality of image capturing apparatuses connected by an interface capable of external synchronization to match time codes of video frames imaged at the same timing.

In order to solve the aforementioned problems, one aspect of the present invention provides an image capturing apparatus comprising: an image capturing unit configured to acquire a video signal including frames, and an output unit configured to output the video signal, a first time code for a time at which each frame of the video signal is acquired by the image capturing unit and information related to a second time code for a time at which each frame of the video signal is output by the output unit, to an external apparatus.

Another aspect of the present invention provides an image capturing apparatus comprising: an image capturing unit configured to acquire a first video signal; an acquisition unit configured to acquire a second video signal, a first time code for a time at which each frame of the second video signal is acquired by the external apparatus and information related to a second time code for a time at which each frame of the video signal is output by the external apparatus; and an adding unit configured to add a third time code synchronized with the second time code, to the first video signal.

Still another aspect of the present invention provides an image capturing system comprising a first image capturing apparatus and a second image capturing apparatus, wherein the first image capturing apparatus comprises: a first image capturing unit configured to acquire a first video signal including frames, and an output unit configured to output the first video signal, a first time code for a time at which each frame of the first video signal is acquired by the first image capturing unit and information related to a second time code for a time at which each frame of the first video signal is output by the output unit, to the second image capturing apparatus, and wherein the second image capturing apparatus comprises: a second image capturing unit configured to acquire a second video signal; an acquisition unit configured to acquire the first video signal, the first time code for a time at which each frame of the first video signal is acquired by the first image apparatus and information related to the second time code for a time at which each frame of the first video signal is output by the first apparatus; and an adding unit configured to add a third time code synchronized with the first time code, to the second video signal.

Yet another aspect of the present invention provides a control method of an image capturing apparatus comprising: image capturing in which a video signal including frames is acquired; and outputting the video signal, a first time code for a time at which each frame of the video signal is acquired by the image capturing unit and information related to a second time code for a time at which each frame of the video signal is output in the outputting, to an external apparatus.

Still yet another aspect of the present invention provides a control method of an image capturing apparatus comprising: image capturing in which a video signal is acquired; acquiring a second video signal, a first time code for a time at which each frame of the second video signal is acquired by the external apparatus and information related to a second time code for a time at which each frame of the video signal is output by the external apparatus; and adding a third time code synchronized with the second time code, to the first video data.

Yet another aspect of the present invention provides a non-transitory computer-readable storage medium storing a program for causing a computer to execute a control method of an image capturing apparatus comprising: image capturing in which a video signal including frames is acquired; outputting the video signal, a first time code for a time at which each frame of the video signal is acquired by the image capturing unit and information related to a second time code for a time at which each frame of the video signal is output in the outputting, to an external apparatus.

Still yet another aspect of the present invention provides a non-transitory computer-readable storage medium storing a program for causing a computer to execute a control method of an image capturing apparatus comprising: image capturing in which a video signal is acquired; acquiring a second video signal, a first time code for a time at which each frame of the second video signal is acquired by the external apparatus and information related to a second time code for a time at which each frame of the video signal is output by the external apparatus; and adding a third time code synchronized with the second time code, to the first video data.

According to the present invention, it is possible to provide a technique according to which it is possible for a plurality of image capturing apparatuses connected by an interface capable of external synchronization to match time codes of video frames imaged at the same timing.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 11 is a timing chart showing time code synchronization according to a fifth embodiment.

DESCRIPTION OF THE EMBODIMENTS

First Embodiment

Hereinafter, exemplary embodiments of the present invention will be described in detail with reference to the drawings. It should be noted that an example of using a video camera capable of matching time codes of video frames imaged at the same time (also simply referred to as time code synchronization) using an SDI terminal will hereinafter be described as an example of an image capturing apparatus. However, the present embodiment is not limited to the case of using an SDI terminal, and is applicable also to a wired or wireless interface capable of external synchronization and transmission of time codes. Also, the present embodiment is not limited to a video camera, and is applicable also to other devices. These devices may include mobile telephones, such as smartphones, personal computers, game devices, tablet terminals, medical devices, devices in monitoring systems or vehicle-mounted systems, and the like.

System Configuration

Figure 1:
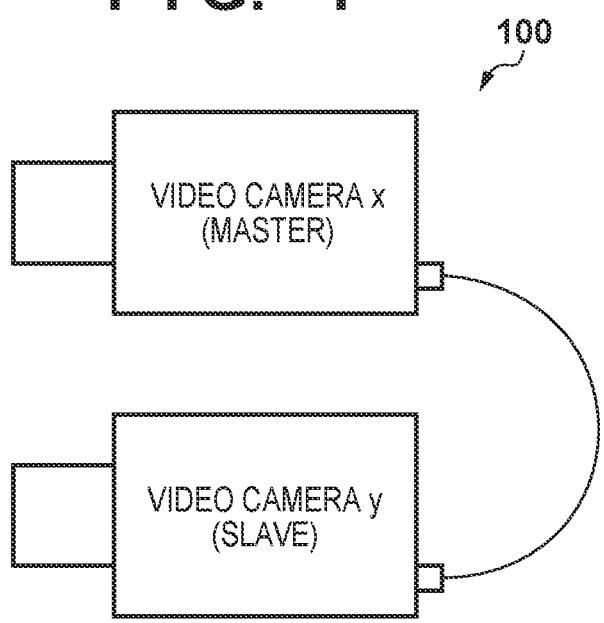
FIG. 1 is a diagram showing an exemplary configuration of an image capturing system according to the present embodiment.

FIG. 1 shows an example of an image capturing system 100 according to the present embodiment. The image capturing system 100 is a system for performing imaging simultaneously using a plurality of video cameras (e.g., video camera x and video camera y). Each video camera can perform external synchronization and is connected by an SDI cable according to which time codes can be synchronized by performing later-described processing. In the example shown in FIG. 1, the video camera x operates as a time code master, and the video camera y operates as a slave.

Figure 2:
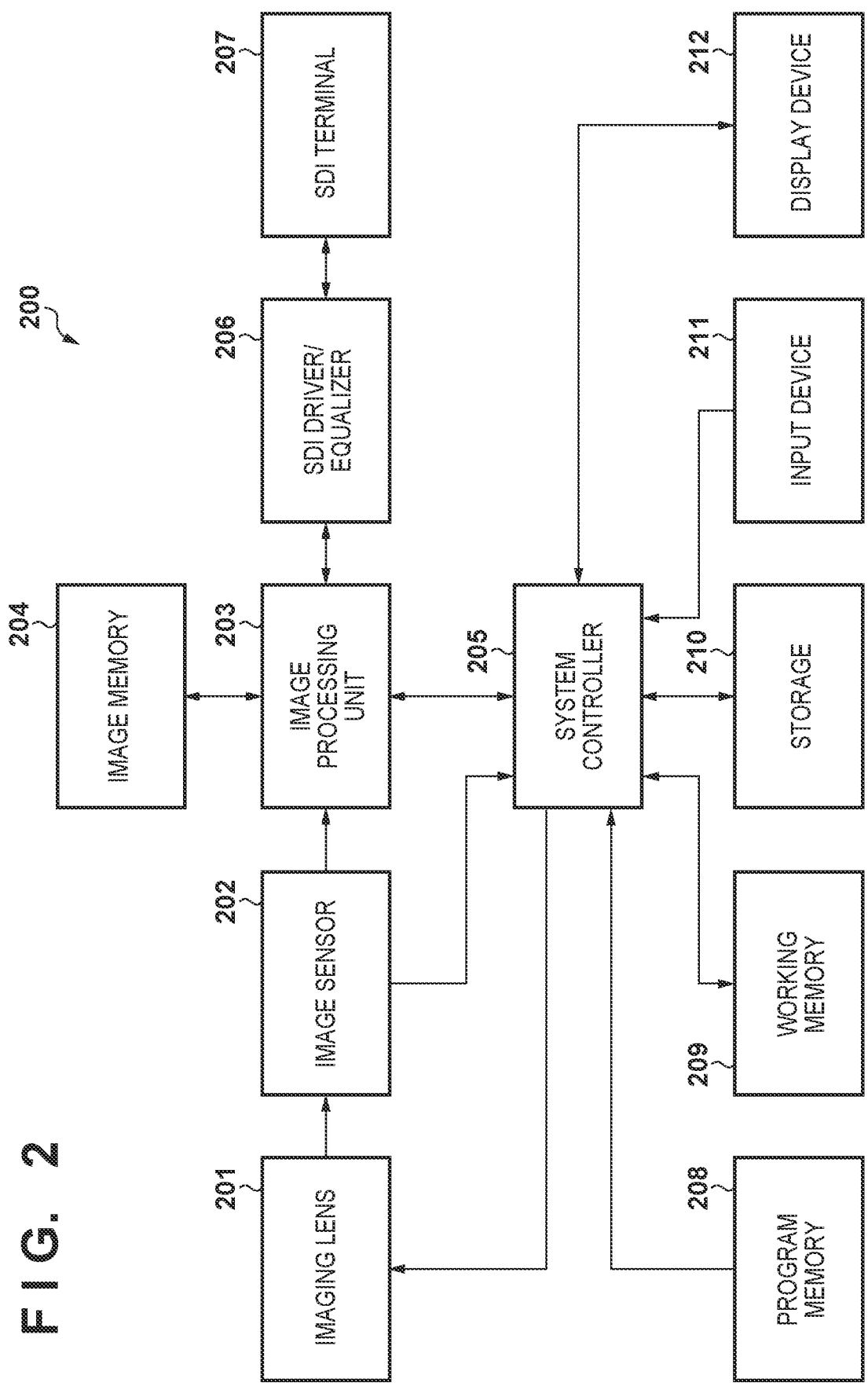
FIG. 2 is a block diagram showing an exemplary functional configuration of a video camera according to the present embodiment.

Next, an exemplary functional configuration of a video camera 200 serving as an image capturing apparatus will be described with reference to FIG. 2. It should be noted that the functional configuration of the video camera 200 to be described with reference to FIG. 2 is applied to both the video cameras x and y as well.

An imaging lens 201 forms an optical image of a subject on the image capture surface of an image sensor 202 while realizing an aperture changing function, an angle of view changing function, and a focal distance changing function according to instructions from a later-described system controller 205 or operation instructions from a user. The image sensor 202 has a configuration in which a plurality of pixels having photoelectric conversion elements are aligned two-dimensionally. The image sensor 202 photoelectrically converts the optical image of the subject formed by the imaging lens 201 using the pixels, and furthermore performs analog-digital conversion using an A/D conversion circuit and outputs a digital signal (video signal) in units of pixels. The image sensor 202 sequentially outputs the video signal in units of frames. Also, the image sensor 202 notifies the system controller 205 of the exposure timing.

The image processing unit 203 is, for example, a circuit for image processing that develops the video signal output from the image sensor 202 for a period corresponding to one frame and thereafter stores the developed video signal in the image memory 204 as developed data. The image processing unit 203 furthermore applies image processing such as resizing for a period corresponding to one frame on the developed data stored in the image memory 204 and once again stores the resulting developed data in the image memory 204 as video data for SDI. The image processing unit 203 adds the time code from the system controller 205 and other data as ancillary data (auxiliary data) to the video data for SDI stored in the image memory 204 and outputs the resulting video data to the SDI driver/equalizer 206. It should be noted that the ancillary data can provide separate time codes and other data to each frame of the video signal. The SDI driver/equalizer 206 outputs the input signal as an SDI signal to the exterior via the SDI terminal 207. The SDI signal output from the SDI terminal 207 is input to a recorder or monitor (not shown) via an SDI cable. Thus, there is a delay of a period corresponding to two frames from when the image sensor 202 takes in the video as an electrical signal, to when the video signal is output from the SDI terminal 207.

On the other hand, if the video data for SDI is input from the SDI terminal 207, the image processing unit 203 acquires the video data from the SDI driver/equalizer 206 and extracts the time code and other ancillary data from the video data. The image processing unit 203 outputs the extracted ancillary data (time code and other ancillary data) to the system controller 205.

The image memory 204 is, for example, a volatile memory such as an SDRAM, and temporarily stores various types of data, such as moving image data, still image data, and audio data.

For example, the system controller 205 includes an arithmetic circuit such as a CPU (or MPU), and controls the blocks of the video camera 200 and data transfer between the blocks by executing programs stored in a program memory 208. Also, the system controller 205 controls the blocks of the video camera 200 in response to an operation signal from an input device 211 that receives operations from a user. The system controller 205 can perform compression encoding and decoding with a predetermined compression encoding method on the video signal resulting from image processing performed by the image processing unit 203. Then, the system controller 205 temporarily stores the compressed video signal in a working memory 209, and thereafter reads out the compressed video signal stored in the working memory 209 as appropriate according to need and stores it in a storage 210, which is a storage unit. Also, the system controller 205 has a function of generating a time code based on the information on the exposure timing acquired from the image sensor 202 and outputting the time code to the image processing unit 203. The system controller 205 also has a function of, if another SDI signal is received from the SDI terminal 207, processing the time code of the SDI signal acquired by the image processing unit 203 to synchronize it with the imaging performed by the video camera, adding the time code to the video signal, and storing the resulting video signal in the storage 210. Other than this, the system controller 205 communicates with the imaging lens 201 and transmits instructions for adjusting the aperture, changing the angle of view, and adjusting the focal length to the imaging lens 201.

The SDI terminal 207 functions as an interface for receiving SDI-format video data transmitted from an external apparatus via the SDI cable, or outputting SDI-format video data output from the image processing unit 203 to the external apparatus via the SDI cable.

The program memory 208 is a non-volatile storage medium and is constituted by a semiconductor memory, a magnetic disk, or the like. The program memory 208 stores programs to be executed by the system controller 205, constants for operation, and the like. The working memory 209 is a volatile memory such as an SDRAM for example, and temporarily stores data and the like that is needed for the processing performed by the system controller 205.

The storage 210 is a non-volatile storage medium and is constituted by a semiconductor memory, a magnetic disk, or the like. The input device 211 includes an operation member constituted by switches and buttons, converts operation instructions from a user into electrical signals, and notifies the system controller 205. The display device 212 includes a display device such as a liquid crystal display, an organic EL display, or electronic paper. The display device 212 displays the imaged video and the state of the video camera 200 in response to an instruction from the system controller 205.

Method of Adding and Synchronizing Time Code

Figure 3:
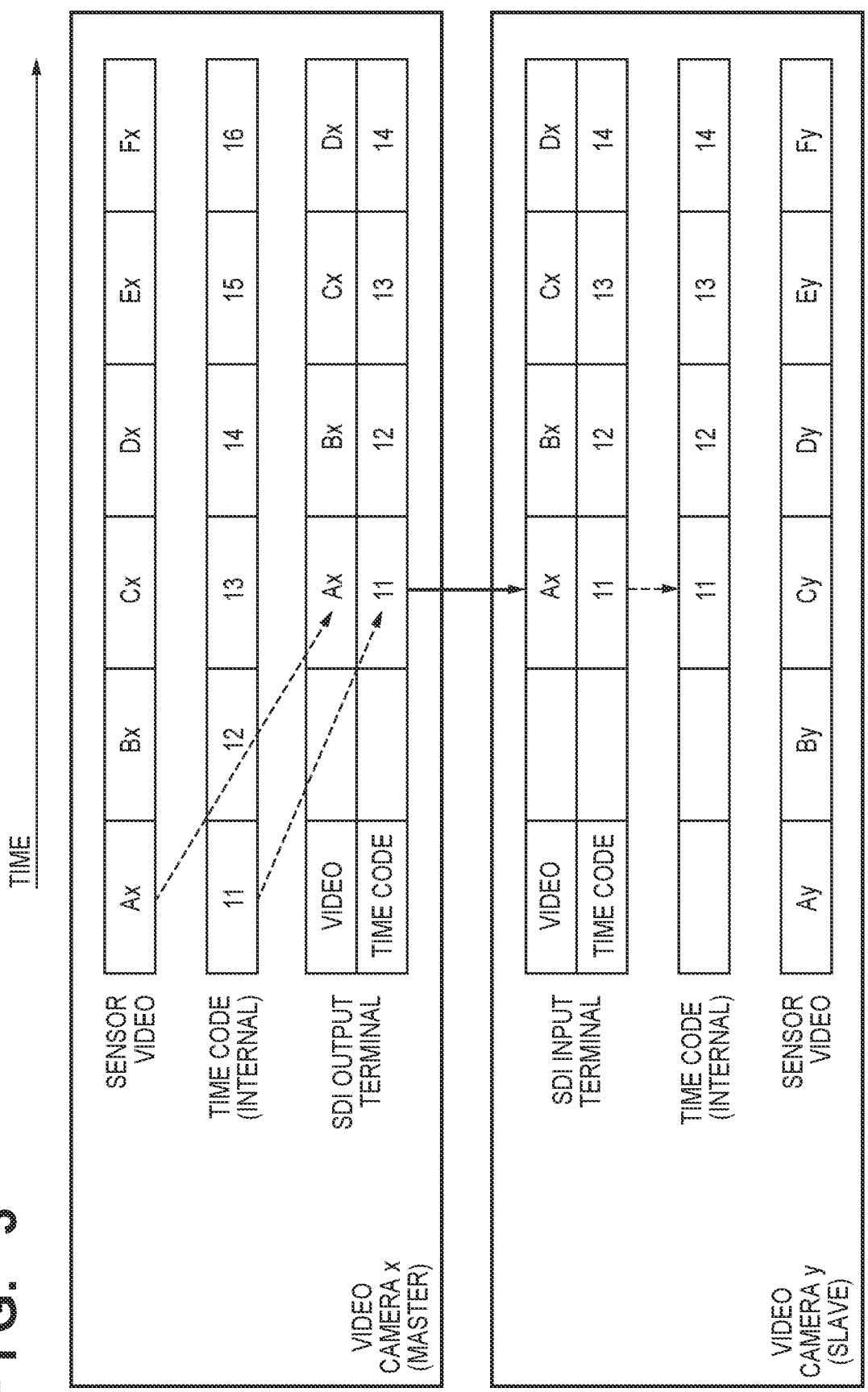
FIG. 3 is a timing chart for illustrating conventional time code synchronization.

First, time code delay information that is added when a video is transmitted using an SDI terminal will be described with reference to FIG. 3. FIG. 3 shows an operation of attempting to synchronize time codes of two video cameras using SDI signals. In a system composed of a video camera x, which is a time code master, and a video camera y, which is a slave, sensor videos, the internal time codes of the cameras, and video data (video frames and time codes) input and output through the SDI terminal are indicated. It should be noted that in the following description, it is assumed that the state in which the phases of the video frames are aligned using an external synchronization signal is being maintained. Also, in this example, the video camera x takes two frames' worth of time from when the video is imaged to when the video is output to the SDI output terminal.

"Ax to Fx" indicate the video frames imaged by the image sensor (sensor) of the video camera x, and "Ay to By" indicate the video frames imaged by the sensor of the video camera y. "Ax" and "Ay", "Bx" and "By", and the like are video frames imaged by the sensors of the video camera x and the video camera y at the same time. Also, the numbers "11 to 16" indicate the frame count portion of the time code. That is, the video camera x adds the time code "11" to the video frame "Ax" and outputs the result from the SDI output terminal. The video camera y acquires the time code "11" from the video camera x and adds the time code "11" to the video frame being imaged by the video camera y. As described above, with the video camera x, a processing delay corresponding to two frames occurs from the time when the video frame "Ax" is imaged to when the SDI signal is output, and therefore the time code "11" in the video camera y is input at a timing when the video frame "Cy" is imaged. In the case of performing the same method as the synchronization using a time code terminal conforming to SMPTE ST12, the time code "11" is added to the video frame "Cy" imaged by the video camera y, which originally was to have the time code "13".

Next, time code synchronization processing according to the present embodiment will be described with reference to FIG. 4. The video camera x includes, as modes of outputting the time code using an SDI-format signal, a mode of adding the time code to an ineffective video such as a black image and outputting the signal, and a mode of adding the time code and the delay information to the imaged video and outputting the signal. In the following description, a case of using the mode of adding the time code and the delay information to the imaged video and outputting the signal will be described. It should be noted that the delay information of the present embodiment indicates the time lag from when imaging is performed by the image sensor 202 to when output is performed by the SDI terminal 207, for example.

With the video camera x, in response to an instruction from the system controller 205, the image processing unit 203 adds the delay information (e.g., the delay amount indicating the magnitude of the time lag) and the time code to the video frame as ancillary data and outputs the result. In the example shown in FIG. 4, the video frame "Ax" imaged when the time code is "11" is output at the time code "13", and thus a delay corresponding to two frames is generated. At this time, the delay amount added to the SDI-format video data is "2". It should be noted that the delay amount can differ according to the imaging mode, the operating state, and the like. For example, delay amounts estimated for each imaging mode and operating state can be stored in the program memory 208 in advance. The system controller 205 reads out the delay amount from the program memory 208 according to the imaging mode and operating state and adds the read-out delay amount to the ancillary data.

When the video camera y receives input of the SDI-format video data of the video camera x, the video camera y acquires the video frame, time code, and delay amount from the SDI signal. Also, the video camera y corrects the acquired time code by adding the delay amount thereto, adds the result to the video frames imaged by the video camera y and stores that result in the storage 210.

Figure 4:
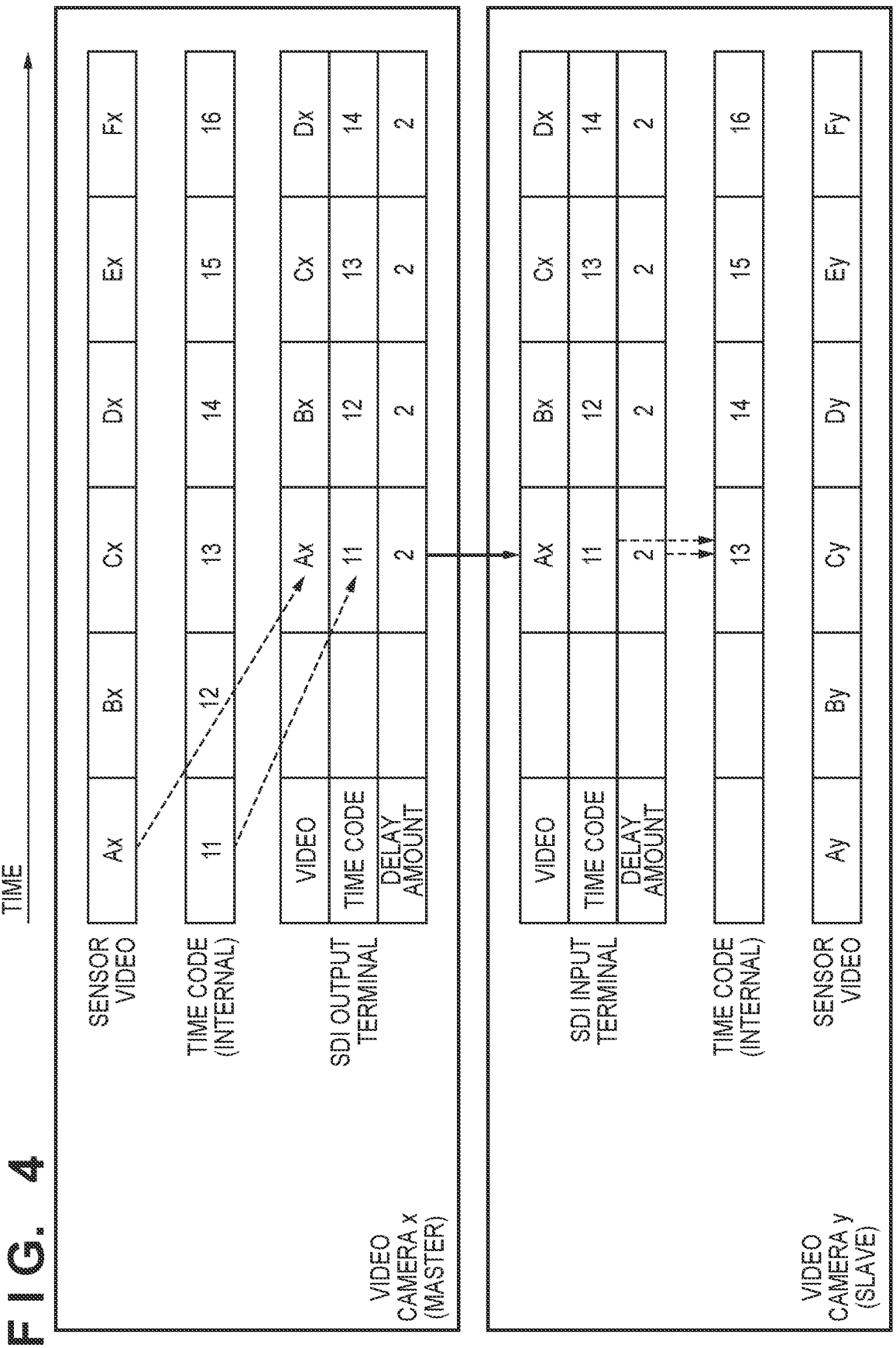
FIG. 4 is a timing chart for illustrating time code synchronization according to a first embodiment.

In the example shown in FIG. 4, the system controller 205 of the video camera y acquires the time code "11" and the delay amount "2" included in the SDI-format video data input from the video camera x. Also, the time code "13" (i.e., the time code for the time of being output from the SDI terminal), which is obtained by adding the delay amount "2" to the time code "11", is obtained, and the obtained time code is synchronized so as to correspond to the video frame currently being imaged. Thereafter, the system controller 205 stores the video signal to which the time code was added in the storage 210. By doing so, the video camera y can provide the time code "13", which is the same as "Cx" at which the video camera x performed imaging, to the video frame "Cy", which was imaged at the same time. That is, the video camera x and the video camera y can correctly achieve time code synchronization.

Exception Processing in Slave Video Camera

Figure 5:
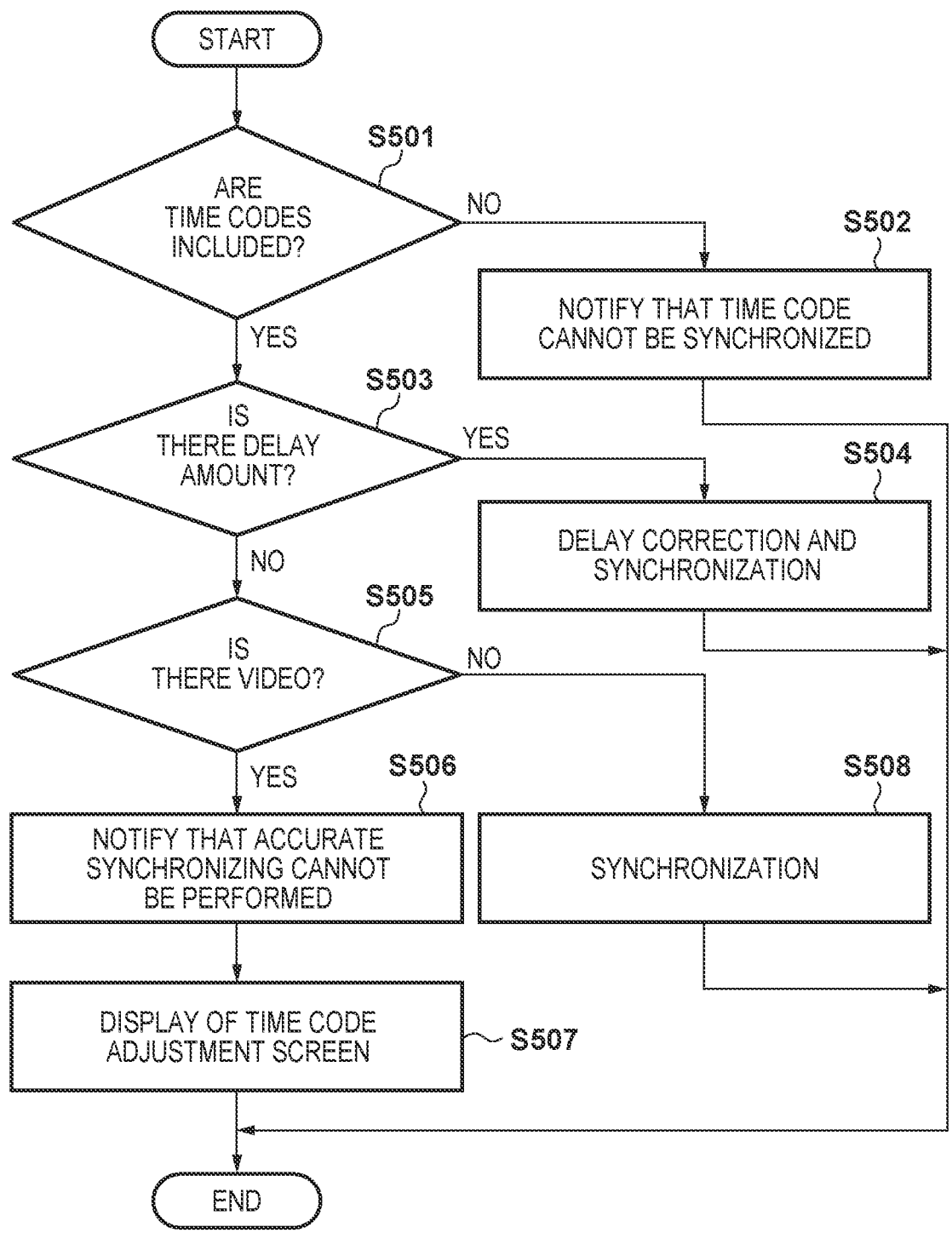
FIG. 5 is a flowchart showing exception processing performed by a slave device according to the first embodiment.

The video camera y, which is a slave, needs to perform suitable processing even if a signal not including the time code and the delay amount is input. Hereinafter, exception processing performed by a slave video camera will be described with reference to FIG. 5. It should be noted that the present processing is achieved by the system controller 205 executing a program read out from the program memory 208. Also, the present processing is started at the time when the system controller 205 detects input of SDI-format video data (which was output from the master video camera x, which is an external apparatus).

In step S501, the system controller 205 determines whether or not the time code is included in the SDI-format video data. For example, when video data is input from the SDI terminal 207, the image processing unit 203 acquires the video data from the SDI driver/equalizer 206 and extracts the ancillary data (time code and other ancillary data) from the video data. Then, the image processing unit 203 outputs the extracted ancillary data to the system controller 205. The system controller 205 determines whether or not the time code is included in the data output from the image processing unit 203, and if it is determined that the time code is included, the processing advances to step S503, and if not, the processing advances to step S502.

In step S502, the system controller 205 cannot synchronize the time code, and therefore displays an error message or the like on the display device 212 and notifies the user that time code synchronization cannot be performed. Upon ending notification to the user, the system controller 205 thereafter ends the present processing.

In step S503, the system controller 205 determines whether or not the delay amount is included in the SDI-format video data. For example, the system controller 205 determines whether or not the delay amount is included in the ancillary data acquired from the image processing unit 203, and if it is determined that the delay amount is included, the processing advance to step S504, and if not, the processing advances to step S505. For example, if the system controller 205 acquires ancillary data in which the time code "11" and the delay amount "2" are included from the image processing unit 203, the system controller 205 determines that the delay amount is included, and the processing advances to step S504. It should be noted that even if the delay amount is included in the SDI-format video data, if it is not an effective value, the system controller 205 may determine that the delay amount is not included, and the processing may advance to step S505.

In step S504, the system controller 205 uses the acquired delay amount to correct the time code and perform synchronization. For example, in the example shown in FIG. 4, the system controller 205 has acquired the data including the time code "11" and the delay amount "2" from the image processing unit 203. In this case, for the video frame "Cy" currently being imaged, the time code "13", which is obtained by correcting the time code "11" by adding the delay amount "2" thereto, is obtained for the video frame "Cy" currently being imaged, and the time code in the slave apparatus is synchronized therewith. As a result, the time code "13" is associated with the video frame "Cy". The system controller 205 performs delay correction and synchronization of the time code for each video frame, for example, and when the SDI signal is complete, the present processing is ended thereafter.

In step S505, the system controller 205 determines whether or not an effective video is included in the input SDI-format signal. If the system controller 205 determines that an effective video is included in the input SDI-format signal, the processing advances to step S506, and if not, the processing advances to step S508. In step S508, the system controller 205 performs time code synchronization without performing delay correction. The system controller 205 performs similar time code synchronization for each frame, for example, and when the SDI signal is complete, the present processing is ended thereafter.

On the other hand, in step S506, if no delay information is present, there is a possibility that the time code to be added will differ, despite the videos imaged at the same time by the video camera x and the video camera y as in the case shown in FIG. 3. For this reason, the system controller 205 displays an error message or the like on the display device 212 to notify the user that accurate time code synchronization cannot be performed. In step S507, the system controller 205 displays a time code adjustment screen on the display device 212 and prompts the user to perform correction manually. Upon receiving a corrected value from the user, the system controller 205 may use the corrected value to perform time code synchronization. When the SDI signal is complete, the present processing is ended thereafter.

As described above, according to the above-described first embodiment, the master video camera adds the delay information of the time code generated in the period from imaging to output, and the time code for the imaging time as ancillary data (auxiliary data) to the video signal. On the other hand, in the slave video camera, the delay information and the time code for the imaging time of the video frame of the master video camera are acquired, the time code for the master output time is obtained, and the time code of the slave video camera is synchronized. By doing so, processing corresponding to the delay amount can be performed by the slave video camera and the timecode can be suitably synchronized. That is, in the plurality of image capturing apparatuses connected by an interface capable of external synchronization, the time codes of video frames imaged at the same timing can be matched.

Also, if the slave video camera receives input of a signal that cannot be subjected to time code delay correction, such as an SDI signal in which no time code is included, the slave video camera performs error notification without performing synchronization processing with the signal. For this reason, synchronization using an unsuitable time code can be prevented.

Second Embodiment

Next, a second embodiment will be described. In the second embodiment, the master video camera is configured to add the time code for the time of imaging and the time code subjected to delay correction to the video signal. It should be noted that the video camera of the present embodiment has a configuration for performing time code addition and synchronization that is different from that of the first embodiment, but other configurations are the same as those of the first embodiment. For this reason, identical configurations are denoted by identical reference numerals, redundant description is omitted, and description will be given with a focus on points of difference.

Method of Adding and Synchronizing Time Code

Figure 6:
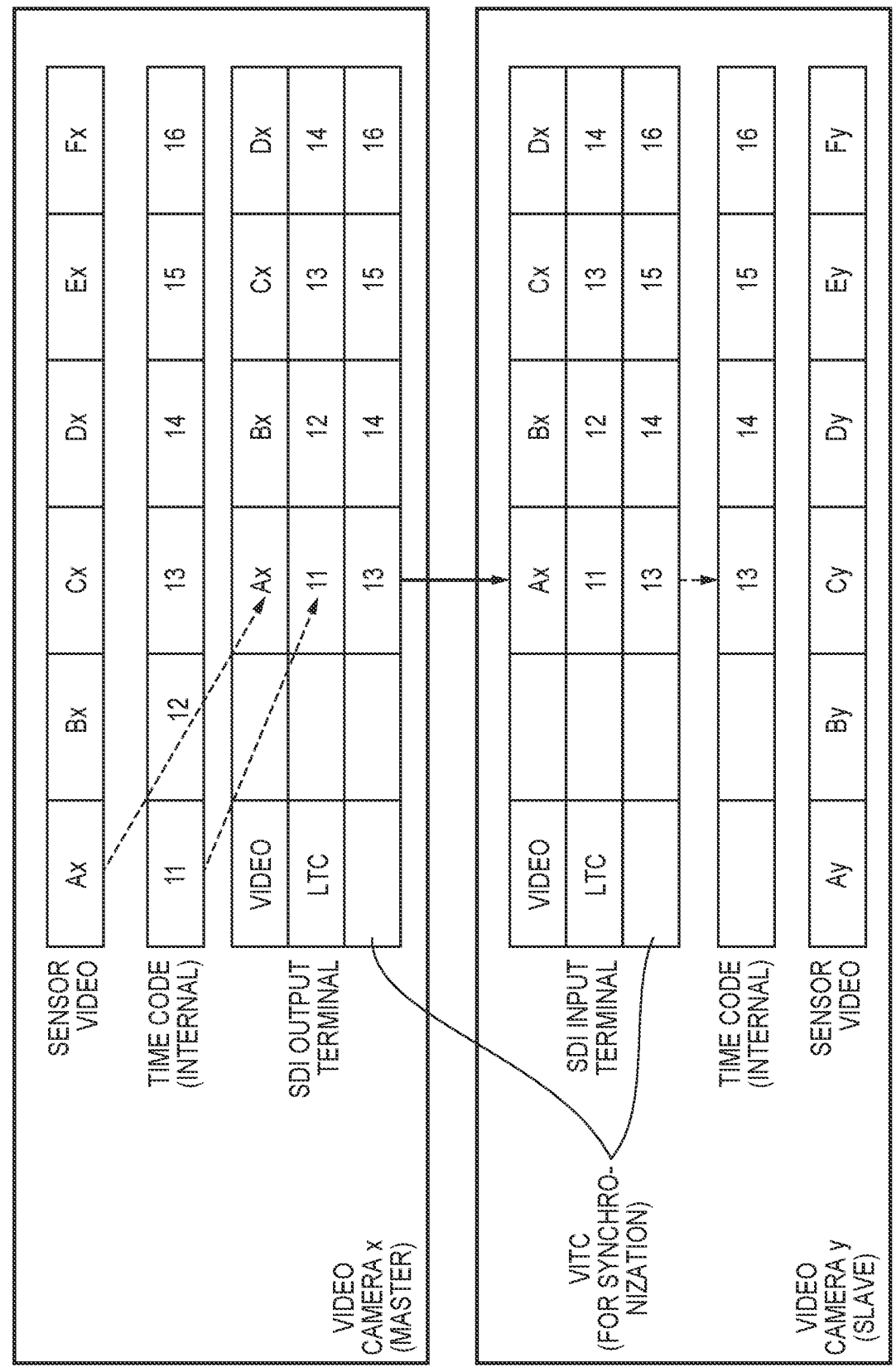
FIG. 6 is a timing chart for illustrating time code synchronization according to a second embodiment.

Next, time code synchronization processing according to the second embodiment will be described with reference to FIG. 6. In the present embodiment, as one mode of outputting the time code using an SDI-format signal, the video camera x, which is the master, has a mode of adding the normal time code and a time code resulting from delay correction to the imaged video and outputting a signal. It should be noted that in the following description, a case will be described in which the mode of adding the two time codes to the imaged video and outputting the result is used.

The video camera x adds two types of time codes: an LTC (Longitudinal Time Code) and a VITC (Vertical Interval Time Code) as ancillary data to the video frame and outputs the result. At this time, the LTC is a time code that has not been subjected to delay correction (i.e., a time code that is provided at the time of imaging), and the VITC is a time code that has been subjected to delay correction.

In this example, similarly to the above-described embodiment, the processing delay of the video camera x corresponds to two frames. The video camera x adds the time code "11" for the time at which the video frame "Ax" was imaged to the ancillary data as the LTC, and adds the time code "13" for the output time, which is calculated by performing delay correction (adding the delay amount "2"), to the ancillary data as the VITC. It should be noted that the delay amounts are stored in the program memory 208 in advance as a table, for example, and the system controller 205 may read out the delay amounts from the program memory 208 and perform delay correction.

On the other hand, the slave video camera y acquires the SDI signal including the video frame and the LTC and VITC time codes from the video camera x. Also, the video camera y synchronizes the time code of the video camera y according to the acquired VITC. Then, the time code synchronized using the VITC is added to the video frame imaged by the video camera y, and the result is stored in the storage 210.

In this example, the video camera y adds the VITC "13" transmitted from the video camera x to the video frame "Cy" and stores the result in the storage 210. By doing so, the same time code "13" is provided for the video frames "Cx" and "Cy" that were imaged at the same time, and the video camera x and the video camera y can be synchronized with the correct time code.

Here, an example was shown in which the LTC is processed as a time code without delay correction and the VITC is processed as a time code with delay correction, but conversely, the VITC may be added as a time code without delay correction and the LTC may be added as a time code with delay correction. Other than this, one or both of the LTC and the VITC may be used as time codes without delay correction, and furthermore, a time code that has been subjected to delay correction may be added as another piece of ancillary data. It should be noted that if the slave video camera y acquires a plurality of time codes, it is sufficient that the slave video camera y compares them and selects the time code with the most preceding time as the time code for synchronization. This makes it possible to handle adding time codes in any format when a time code with delay correction and a time code without delay correction are acquired.

Slave Exception Processing

Figure 7:
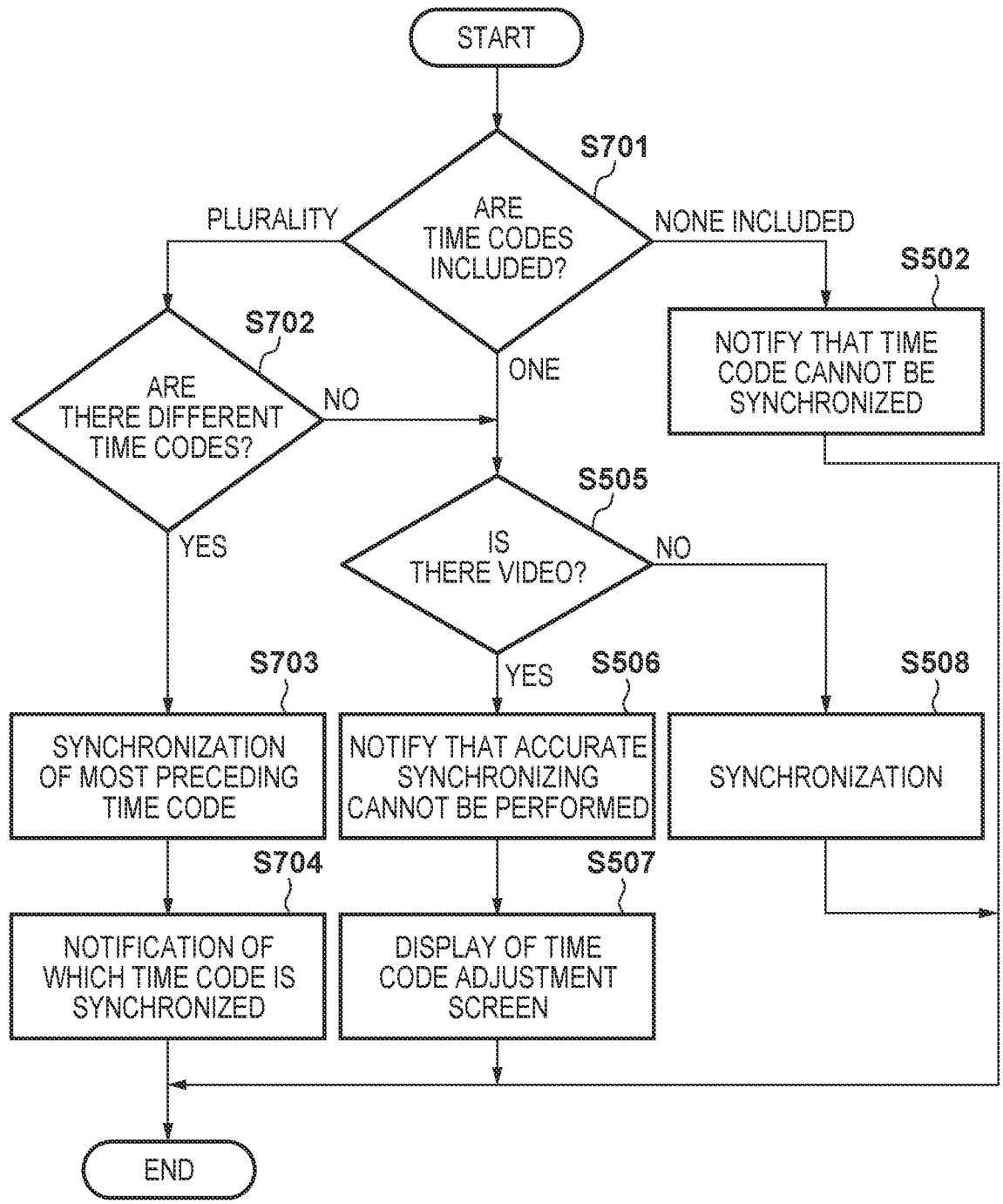
FIG. 7 is a flowchart showing exception processing performed by a slave device according to the second embodiment.

Next, exception processing performed by the video camera y, which is a slave, will be described with reference to FIG. 7. It should be noted that the present processing is achieved by the system controller 205 executing a program read out from the program memory 208. Also, the present processing is started at the time when the system controller 205 detects input of an SDI signal (which was output from the video camera x, which is the master).

In step S701, the system controller 205 determines whether or not the time code is included in the SDI-format video data. Specifically, when SDI-format video data is input from the SDI terminal 207, the image processing unit 203 acquires the video data from the SDI driver/equalizer 206, extracts the ancillary data of the video data, and outputs it to the system controller 205. The system controller 205 determines whether or not a time code is included in the ancillary data output from the image processing unit 203. If the system controller 205 determines that a plurality of time codes are included, the processing advances to step S702, and if the system controller 205 determines that one time code is included, the processing advances to step S505. Also, if it is determined that no time code is included, the processing advances to step S502.

In steps S502 and S505 to S508, the system controller 205 performs processing similarly to the first embodiment.

In step S702, the system controller 205 determines whether or not there are different time codes in the plurality of time codes. Specifically, the system controller 205 compares the phases of the plurality of time codes. As a result of the phase comparison, if the phases of all of the time codes match, the system controller 205 determines that there are no different time codes in the plurality of time codes (the same applies in the case where there is one time code), and the processing moves to step S705. On the other hand, if the phase of at least one time code is different from the phase of another time code, the system controller 205 determines that there are different time codes in the plurality of time codes, and the processing moves to step S703.

In step S703, the system controller 205 selects the most preceding time code among the plurality of time codes and synchronizes the internal time code of the video camera y using the selected time code. Furthermore, in step S704, the system controller 205 controls the display device 212 to display the time code selected in step S703 (the most preceding time code) and thus notifies the user which time code was used for synchronization. By doing so, it is possible to provide the user with an opportunity to check which of the plurality of time codes transmitted from the master video camera has been selected. The system controller 205 performs synchronization of the time code for each video frame, for example, and when the SDI signal is complete, the present processing is ended thereafter.

As described above, according to the above-described second embodiment, the master video camera adds the time code provided at the time of imaging and the time code resulting from delay correction to the video signal as auxiliary data and outputs the result. Also, the slave video camera extracts the time code that has advanced the most from the ancillary data of the acquired SDI-format video data and uses the extracted time code to synchronize the time code corresponding to the video at the time of imaging on the slave side. By doing so, the time codes can be easily and suitably synchronized between the master and slave. In the present embodiment, the ancillary data for a known time code, such as an LTC or a VITC, is used, and therefore there is an advantage in that the ancillary data does not need to be newly defined.

Also, if the slave video camera acquires a plurality of time codes, the slave video camera compares them and selects the time code with the most preceding time as the time code for synchronization. This makes it possible to handle adding time codes in any format when a time code with delay correction and a time code without delay correction are acquired together.

Third Embodiment

Next, a third embodiment will be described. A slave video camera of the third embodiment has a configuration that can handle both a case in which the master video camera adds the delay amount and outputs the video signal in accordance with the first embodiment, and a case in which the master video camera adds the time code resulting from delay correction and outputs the video signal in accordance with the second embodiment. It should be noted that the video camera of the present embodiment has a different configuration for performing time code synchronization from the above-described embodiment, but its other configurations are the same thereas. For this reason, identical configurations are denoted by identical reference numerals, redundant description is omitted, and description will be given with a focus on points of difference.

Figure 8:
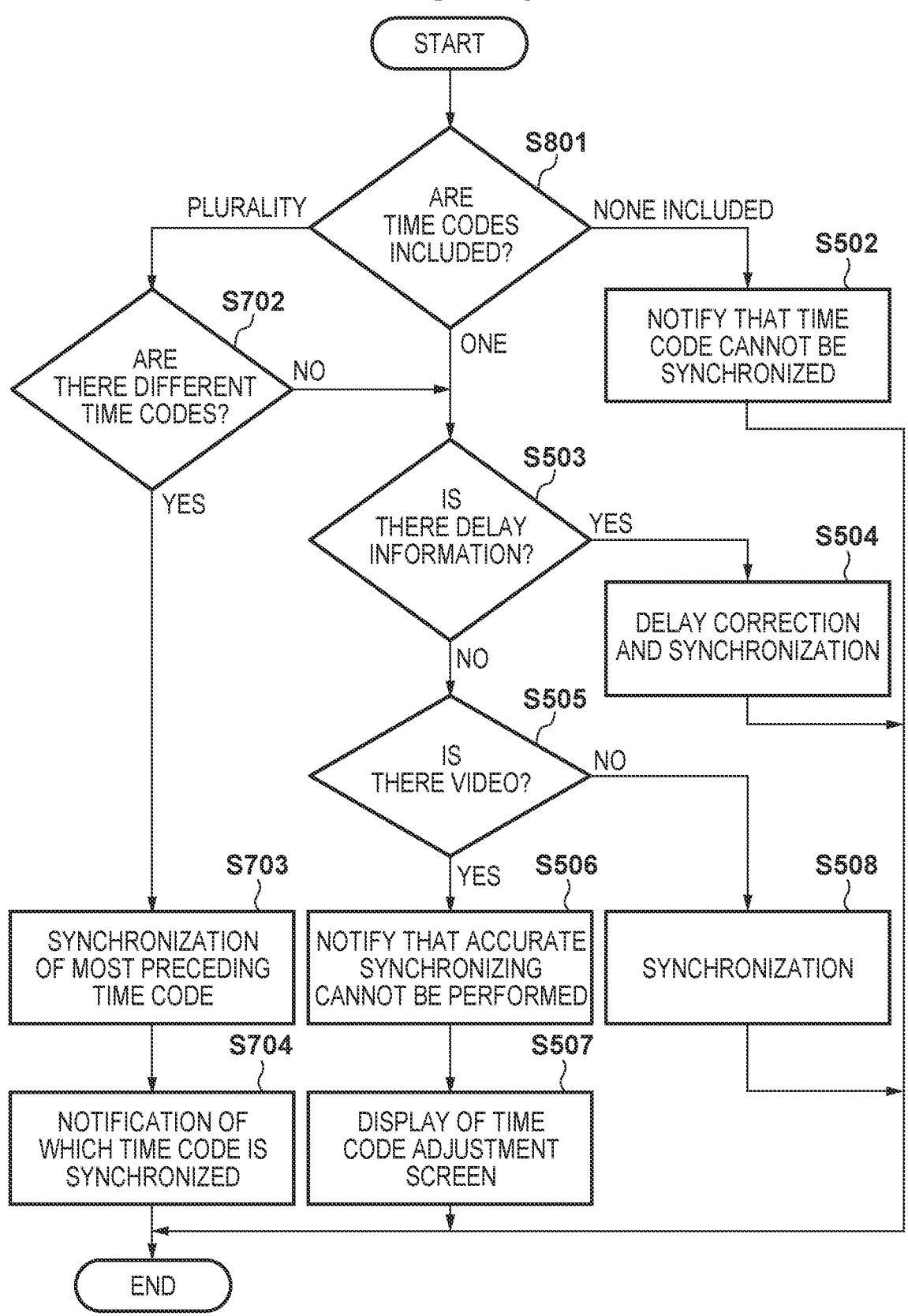
FIG. 8 is a flowchart showing exception processing performed by a slave device according to a third embodiment.

Exception processing performed by the video camera y, which is a slave, will be described with reference to FIG. 8. It should be noted that the present processing is achieved by the system controller 205 executing a program read out from the program memory 208. Also, the present processing is started at the time when the system controller 205 detects input of SDI-format video data (which was output from the video camera x, which is the master).

In step S801, the system controller 205 determines whether or not the time code is included in the SDI-format video data. Specifically, when an SDI signal is input from the SDI terminal 207, the image processing unit 203 acquires the signal from the SDI driver/equalizer 206, extracts the ancillary data of the signal, and outputs it to the system controller 205. The system controller 205 determines whether or not a time code is included in the ancillary data output from the image processing unit 203, and if it is determined that a plurality of time codes are included, the processing advances to step S702, and if it is determined that one time code is included, the processing advances to step S503. Also, if it is determined that no time code is included, the processing advances to step S502.

If the system controller 205 determines that a plurality of time codes are included in the ancillary data, the system controller 205 performs processing similarly to the second embodiment in steps S702 to S704. That is, even with a configuration in which the master video camera x transmits an SDI signal to which a plurality of time codes are added, the slave video camera y can synchronize the time codes through the processing of steps S702 to S704.

Also, if it is determined that there is one time code included in the ancillary data or that there is no time code included in the ancillary data, the system controller 205 performs processing similarly to the first embodiment in steps S503 to S508. That is, even with a configuration in which the master video camera x transmits an SDI signal to which a delay amount has been added, the slave video camera y can synchronize the time codes by performing delay correction through the processing of steps S503 and S504.

As described above, according to the above-described third embodiment, even in the case where the master outputs a plurality of different time codes or the case where the master adds a delay amount and performs output, the slave video camera can suitably perform processing such as synchronization processing or error notification. In other words, if auxiliary data according to which the time code can be corrected is input, time code synchronization can be performed, and if the auxiliary data is not suitable, the user can be notified. Also, it is possible to inhibit the time code from being synchronized with an erroneous external time code.

Fourth Embodiment

Next, a fourth embodiment will be described. In the fourth embodiment, if the master video camera changes the delay amount for the time code during imaging, the slave video camera also synchronizes the delay amount of the output video frame. It should be noted that the video camera of the present embodiment has a configuration for performing time code addition and synchronization that is different from that of the first embodiment, but other configurations are the same as those of the first embodiment. For this reason, identical configurations are denoted by identical reference numerals, redundant description is omitted, and description will be given with a focus on points of difference.

System Configuration

Figure 9:
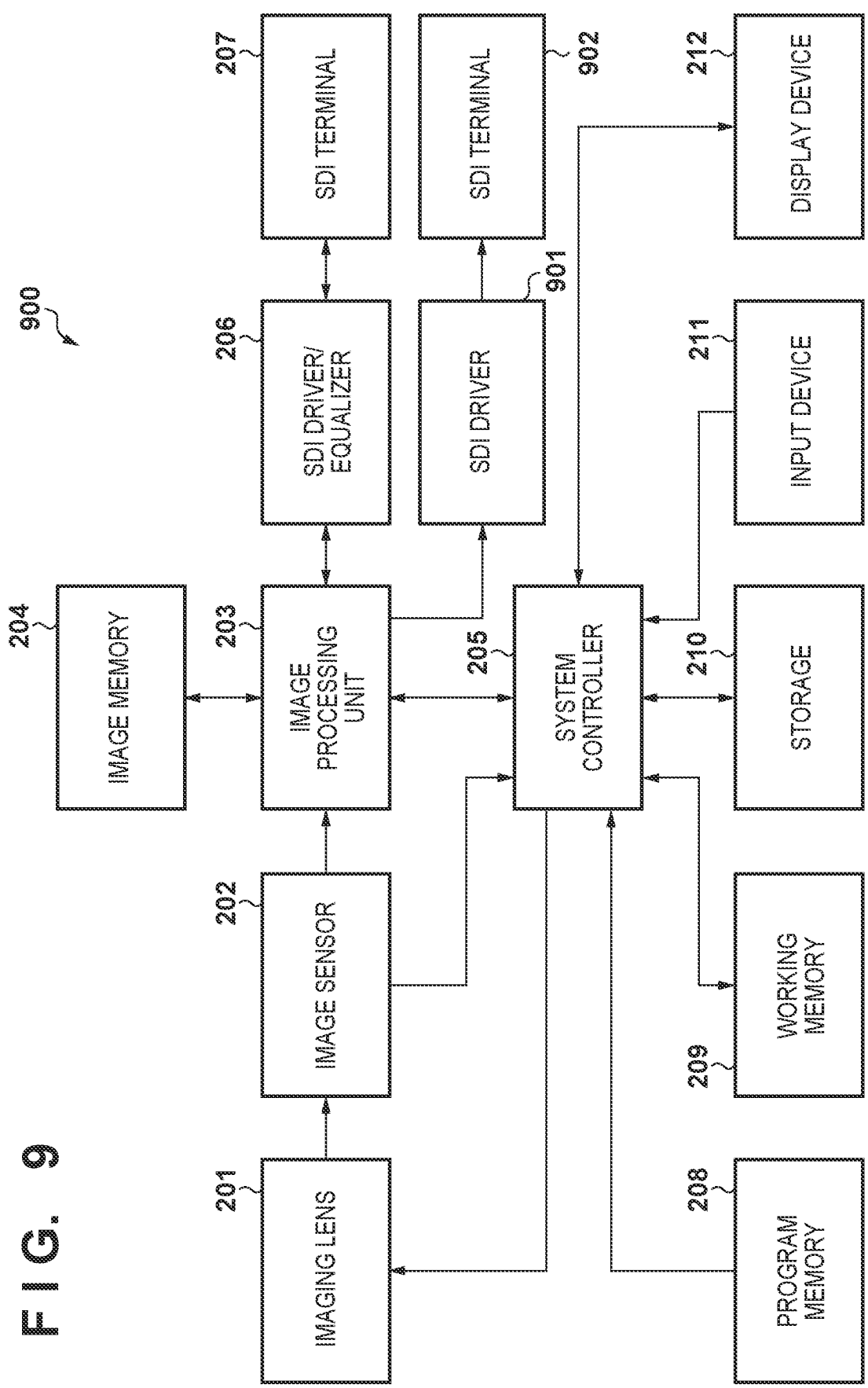
FIG. 9 is a block diagram showing an exemplary functional configuration of a video camera according to a fourth embodiment.

First, an internal configuration of a video camera 900, which is used as the video cameras x and y of the image capturing system 100, will be described with reference to FIG. 9. Reference numerals 201 to 212 indicate configurations similar to those in the first embodiment. An SDI driver 901 and an SDI terminal 902 are provided for outputting SDI signals. That is, SDI-format video data for synchronization can be input from the SDI terminal 207 while SDI-format video data of an imaged video, which is synchronized with the video data, is output. The image processing unit 203 adds the time code input by the system controller 205 and the other ancillary data to the video signal and outputs the result to the SDI driver 901. Then, the signal input to the SDI driver 901 is output to the exterior as an SDI signal via the SDI terminal 902, and is input to a recorder or monitor (not shown) via a cable.

Method of Adding and Synchronizing Time Code

Figure 10:
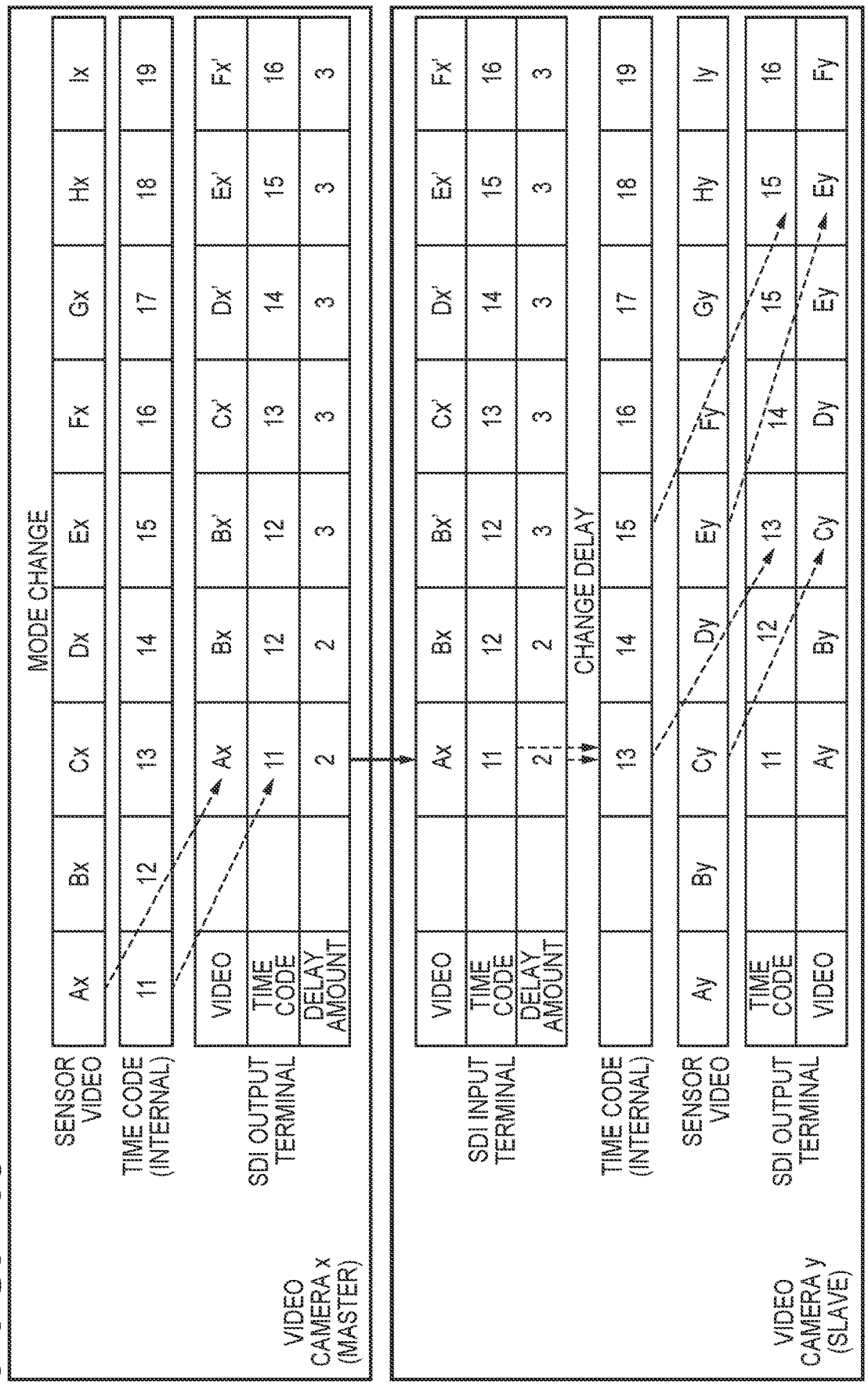
FIG. 10 is a timing chart for illustrating time code synchronization according to the fourth embodiment.

Next, time code synchronization processing according to the fourth embodiment will be described with reference to FIG. 10. The video camera x adds, to the video frame as the ancillary data, the time code and the delay amount from when imaging is performed by the image sensor 202 to when output to the SDI terminals 207 and 902 is performed, and outputs the result. The delay amount changes according to the imaging mode, operating state, and the like, and as described above, may be stored in the program memory 208 in advance for each imaging mode and operating state. For example, there is a mode called "scan reverse" in which the image processing unit 203 reads out the video data that was once held in the image memory 204 in reverse and outputs it to the exterior. In the scan reverse mode, the video frame imaged by the image sensor 202 is normally delayed by one frame and output from the SDI terminal 902. For this reason, if the mode is changed from a mode other than the scan reverse mode to the scan reverse mode, the delay amount changes from "2" to "3". In the example shown in FIG. 10, a mode change to the scan reverse mode is performed during imaging, and the delay amount changes from "2" frames to "3" frames. At the timing at which the delay amount changes, the video frame "Bx'" to which the delay amount "3" was added is inserted into the video data output in the SDI format.

On the other hand, the slave video camera y acquires the video frame, the time code, and the delay amount from the SDI output transmitted from the video camera x. Then, the video camera y adds the time code obtained by performing delay correction on the image frame "Bx'" by adding the delay amount "3" to the acquired time code "12", and the video camera y outputs the result from the SDI terminal 902.

The system controller 205 of the video camera y controls the delay amount from when imaging is performed by the image sensor 202 to when output to the SDI terminal 902 is performed, according to the acquired delay amount. That is, in the example shown in FIG. 10, in response to the delay amount input from the SDI terminal 207 changing from "2" to "3", the delay from when imaging is performed by the image sensor 202 of the video camera y to when output to the SDI terminal 902 is performed is controlled to be "3". In the example shown in FIG. 10, at the timing at which the delay amount changes, the delay amount from the imaging time of the video camera y to when output to the SDI terminal 902 is performed is adjusted by repeating the frames and time codes ("15" and "Ey") of the SDI signal by the amount by which the delay amount changed.

Thus, even if the video camera x changes the delay amount, the same time code "16" is provided to the video frames "Fx'" and "Fy" that were imaged at the same time and are to be output from the SDI terminal 902. That is, the SDI terminal 902 of the video camera x and the video camera y can output videos with the same time codes at the same timing, and is useful when checking a video in real time during 3D imaging.

It should be noted that the above description of the present embodiment described, as an example, a method of adding a delay amount together with a time code to an SDI signal as in the first embodiment, but a similar operation may be realized with a method of separately adding a time code resulting from delay correction, as in the second embodiment.

Fifth Embodiment

Furthermore, a fifth embodiment will be described. In the fourth embodiment, the master video camera includes mode information such as the imaging mode and the operating state in the ancillary data and outputs the result, and the slave video camera synchronizes the time stamp using the mode information. It should be noted that the video camera of the present embodiment has a configuration for performing time code addition and synchronization that is different from that of the fourth embodiment, but other configurations are the same as those of the fourth embodiment. For this reason, identical configurations are denoted by identical reference numerals, redundant description is omitted, and description will be given with a focus on points of difference.

Method of Adding and Synchronizing Time Code

Next, time code synchronization processing according to the fourth embodiment will be described with reference to FIG. 11. In this example, the video camera x adds, to the video frame as the ancillary data, the time code and a reference delay amount from when imaging is performed by the image sensor 202 to when output to the SDI terminal 207 or the SDI terminal 902 is performed, and outputs the result. Furthermore, the video camera x adds, as ancillary data, mode information such as the imaging mode and the operating state to the video frame and outputs the result.

The delay amount from when imaging is performed by the image sensor 202 to when output to the SDI terminal 207 or the SDI terminal 902 is performed can change according to the imaging mode or operating state of the video camera x. However, in the present embodiment, the delay amount output as ancillary data from the video camera x sets a constant value that is to serve as a reference value and does not change. In the example shown in FIG. 11, the video camera x performs a mode change during imaging, but the delay amount output as the ancillary data (the delay amount of video frame "Bx'" and onward) remains "2".

The video camera y acquires the video frame, and the time code, delay amount, and mode information included in the ancillary data from the SDI-format video data of the video camera x. Also, a table in which delay amounts (i.e., delay amount correction values) corresponding to the mode information are set in advance, for example, is stored in the program memory 208 of the video camera y. The video camera y obtains the true delay amount of the video camera x by adding the delay amount acquired from the video camera x and the delay amount correction value corresponding to the mode information. Then, the video camera x corrects the time code by adding the obtained delay amount to the time code acquired from the video camera x and outputs the corrected time code and the video frame imaged by the video camera y from the SDI terminal 902.

Also, the system controller 205 of the video camera y performs a mode change according to the acquired mode information such that the delay amount from the imaging time of the video camera y to when output to the SDI terminal 902 is performed and the obtained delay amount of the video camera x match. For example, if the system controller 205 detects a change to the scan reverse mode of the video camera x from the mode information, the system controller 205 causes the image processing unit 203 to change the timing of reading the video data stored once in the image memory 204 and performs a mode change so as to match the delay amount. In the example shown in FIG. 11, the mode information acquired from the SDI-format video data has changed from the reference to "M". Here, a table indicating the delay amount "+1" corresponding to the mode "M" is stored in the program memory 208. In view of this, in response to the mode information changing to "M", the system controller 205 performs a mode change such that the delay amount from the imaging time of the video camera y to when output to the SDI terminal 902 is performed is a total of "3".

By doing so, the same time code "16" is provided to the video frames "Fx'" and "Fy", which were imaged at the same time and are to be output from the SDI terminal 902. That is, the SDI terminal 902 of the video cameras x and y can output videos with the same time code at the same timing. This is useful when checking videos in real time during 3D imaging.

It should be noted that if the delay amount corresponding to the mode information acquired from the output of the video camera x is different from the delay amount corresponding to the mode information of the video camera y, a message to the user prompting mode switching of the video camera y may be displayed on the display device 212 of the video camera y. Also, the present embodiment described a case in which the time code and the delay amount are added to the SDI-format video data, similarly to the first embodiment. However, a similar operation may also be realized with a method of separately adding a time code resulting from delay correction, as in the above-described second embodiment.

As described above, in the present embodiment, the master video camera outputs the video data using the reference delay amount, which is a constant value, and mode information indicating the imaging mode, operating state, and the like as the ancillary data. Then, the slave video camera obtains the delay amount correction value corresponding to the mode information and estimates the true delay amount in the video camera x by adding the delay amount acquired from the video camera x and the delay amount correction value. Then, the slave video camera performs a mode change such that the delay amount of the video camera y and the estimated delay amount of the video camera x match. By doing so, the video camera x and the video camera y can output videos in which the same time codes are provided to video frames imaged at the same timings.

In the above-described embodiment, SDI was described as an example of a signal format and the form of the terminal for outputting videos and time codes, but the present invention may also be applied to a case of outputting a signal regulated by another format, such as HDMI. Also, data other than ancillary data may also be used as the auxiliary data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-246407, filed Dec. 22, 2017, which is hereby incorporated by reference herein in its entirety.

What is claimed is:

1. An image capturing apparatus comprising:
   an image capturing unit configured to acquire a video signal including frames; and
   at least one processor and/or at least one circuit to perform operations of the following units:
   (1) an adding unit configured to add, to each frame of the video signal, (i) a first time code for a time at which each frame of the video signal is acquired by the image capturing unit and (ii) information related to a second time code for a time at which each frame of the video signal is output to an external apparatus, and
   (2) an outputting unit configured to output the video signal to the external apparatus, each frame of the video signal including the first time code and the information related to the second time code.

2. The apparatus according to claim 1, wherein the information includes delay information indicating a time lag from when a frame is acquired by the image capturing unit to when the frame is outputted.

3. The apparatus according to claim 2, wherein the delay information is determined according to at least one of an imaging mode and operating state of the image capturing apparatus.

4. The apparatus according to claim 1, wherein the information includes (a) delay information indicating a time lag from when a frame is acquired by the image capturing unit to when the frame is outputted and (b) mode information indicating at least one of an imaging mode and an operating state of the image capturing apparatus.

5. The apparatus according to claim 1, wherein the at least one processor and/or the at least one circuit further performs operations of a correction unit configured to correct the first time code using a time lag from when imaging is performed to when output is performed, and
   wherein the information includes information related to a time code corrected by the correction unit.

6. The apparatus according to claim 1, wherein the output unit outputs the video signal, the first time code, and the information to an external apparatus in an SDI format, and
   wherein the first time code and the information are added to the video signal as ancillary data.

7. An image capturing apparatus comprising:
   an image capturing unit configured to acquire a first video signal; and at least one processor and/or at least one circuit to perform operations of the following units:
(1) an acquisition unit configured to acquire a second video signal, wherein each frame of the second video signal includes (i) a first time code for a time at which each frame of the second video signal is acquired by an external apparatus and (ii) information related to a second time code for a time at which each frame of the second video signal is output by the external apparatus; and
(2) an adding unit configured to add a third time code synchronized with the second time code, to the first video signal.

8. The apparatus according to claim 7, wherein the at least one processor and/or the at least one circuit further performs operations of an output unit configured to output the first video signal to be added the third time code to another external apparatus.

9. The apparatus according to claim 7, wherein the information includes delay information indicating a time lag from when a frame is acquired by the external apparatus to when the frame is outputted by the external apparatus.

10. The apparatus according to claim 9, wherein the delay information is determined according to at least one of an imaging mode and operating state of the external apparatus.

11. The apparatus according to claim 7, wherein the information includes (a) delay information indicating a time lag from when a frame is acquired by the external apparatus to when the frame is outputted by the external apparatus and (b) mode information indicating at least one of an imaging mode and an operating state of the external apparatus.

12. The apparatus according to claim 7, wherein the at least one processor and/or the at least one circuit further performs operations of a notification unit configured to notify information indicating that the third time code is not synchronized to the second time code in a case where the acquisition unit does not acquire the first time code.

13. The apparatus according to claim 7, wherein the information includes a time code obtained by correcting the first time code using a time lag from when a frame is acquired by the external apparatus to when the frame is outputted by the external apparatus, and
wherein the adding unit synchronizes the third time code with the time code obtained by correcting or the first time code, whichever is a preceding time code.

14. The apparatus according to claim 7, wherein the acquisition unit acquires the second video signal, the first time code, and the information from the external apparatus in an SDI format.

15. An image capturing system comprising:
a first image capturing apparatus; and
a second image capturing apparatus,
wherein the first image capturing apparatus comprises:
(a) a first image capturing unit configured to acquire a first video signal including frames, and
(b) at least one processor and/or at least one circuit to perform operations of the following units:
(1) an adding unit configured to add, to each frame of the first video signal, (i) a first time code for a time at which each frame of the first video signal is acquired by the first image capturing unit, and (ii) information related to a second time code for a time at which each frame of the first video signal is output to the second image capturing apparatus, and
(2) an outputting unit configured to output the first video signal to the second image capturing apparatus, each frame of the first video signal including the first time code and the information related to the second time code, and
wherein the second image capturing apparatus comprises:
(a) a second image capturing unit configured to acquire a second video signal;
(b) at least one processor and/or at least one circuit to perform operations of the following units:
(1) an acquisition unit configured to acquire (i) the first video signal, (ii) the first time code for a time at which each frame of the first video signal is acquired by the first image capturing apparatus, and (iii) the information related to the second time code for a time at which each frame of the first video signal is output by the first image capturing apparatus; and
(2) an adding unit configured to add a third time code synchronized with the first time code, to the second video signal.

16. A control method of an image capturing apparatus, the control method comprising:
image capturing in which a video signal including frames is acquired;
adding, to each frame of the video signal, (i) a first time code for a time at which each frame of the video signal is acquired by the image capturing and (ii) information related to a second time code for a time at which each frame of the video signal is output to an external apparatus; and
outputting the video signal to the external apparatus, each frame of the video signal including the first time code and the information related to the second time code.

17. A control method of an image capturing apparatus, the control method comprising:
image capturing in which a first video signal is acquired;
acquiring a second video signal, wherein each frame of the second video signal includes (i) a first time code for a time at which each frame of the second video signal is acquired by an external apparatus and (ii) information related to a second time code for a time at which each frame of the second video signal is output by the external apparatus; and
adding a third time code synchronized with the second time code, to the first video signal.

18. A non-transitory computer-readable storage medium storing a program for causing a computer to execute a control method of an image capturing apparatus, the control method comprising:
image capturing in which a video signal including frames is acquired;
adding, to each frame of the video signal, (i) a first time code for a time at which each frame of the video signal is acquired by the image capturing and (ii) information related to a second time code for a time at which each frame of the video signal is output to an external apparatus,
outputting the video signal to the external apparatus, each frame of the video signal including the first time code and the information related to the second time code.

19. A non-transitory computer-readable storage medium storing a program for causing a computer to execute a control method of an image capturing apparatus, the control method comprising:
image capturing in which a first video signal is acquired;
acquiring a second video signal, wherein each frame of the second video signal includes (i) a first time code for a time at which each frame of the second video signal is acquired by an external apparatus and (ii) information related to a second time code for a time at which each frame of the second video signal is output by the external apparatus; and adding a third time code synchronized with the second time code, to the first video signal.

* * * * *